*INVENTOR*
FRIEDRICH R. HERTRICH
By *Robert B. Crouch*
ATTORNEY

Aug. 19, 1969 F. R. HERTRICH 3,462,751

HIGH PERFORMANCE RANDOM ACCESS MEMORY

Filed Nov. 26, 1965 4 Sheets-Sheet 2

Aug. 19, 1969 F. R. HERTRICH 3,462,751

HIGH PERFORMANCE RANDOM ACCESS MEMORY

Filed Nov. 26, 1965 4 Sheets-Sheet 4

United States Patent Office 3,462,751

Patented Aug. 19, 1969

3,462,751

HIGH PERFORMANCE RANDOM ACCESS MEMORY

Friedrich R. Hertrich, Boulder, Colo., assignor to International Business Machines Corporation, Armonk, N.Y., a corporation of New York Filed Nov. 26, 1965, Ser. No. 509,889

Int. Cl. G11b *5/76*

U.S. Cl. 340—174.1 7 Claims

ABSTRACT OF THE DISCLOSURE

A high-speed random access memory employing strips of magnetically coated flexible material as the recording medium. A fixed read-write station is provided having a cylindrical chamber and a plurality of circumferentially-spaced, tangentially-extending entry chutes. A plurality of strips are provided in a plurality of trays, each tray being positioned at an entry chute. Solenoid operated means selects a strip from an associated tray by pushing it into engagement with a capstan. The capstan moves the strip into position along the wall of the cylindrical chamber. A strip from each from each of the chutes may be in the chamber simultaneously since the strips are spaced circumferentially along the chamber. A cylindrical drum, having a plurality of heads, is mounted within the cylindrical chamber and constantly rotated so the heads traverse the selected strips.

The present invention relates to a random access data storage device or memory and more particularly to a random access memory which utilizes strips of magnetic tape as the recording medium.

Heretofore, random access memories utilizing strips have been characterized by a large data storage capacity coupled with relatively modest performance characteristics in comparison with other random access devices, such as disk or drum memories. The large data storage capacity of a strip memory is a product of the high volumetric efficiency of a strip, that is, the fact that a strip occupies very little space in comparison with the amount of data which can be recorded on its surface. Accordingly, large numbers of strips, with a consequent large storage capacity, can be assembled within a relatively small space. In a strip memory, the modest performance derives from the relatively slow access time, i.e., the average time required to retrieve a record of data from the memory. The relatively slow access times of strip memories are largely the result of the fact that a selected strip must be individually transported to a read/write station, moved past a fixed transducer in either a reciprocating or rotating manner and then returned to its original position within the memory. The access time is thus directly related to the physical distance over which the strip must be transported to bring it into recording relation with the transducer, which is in turn a function of the overall size of the memory. Accordingly, in conventional strip memories, the large storage capacities desired have been available only at the cost of a consequent decrease in performance.

An object of the present invention is to provide an improved random access memory utilizing tape strips which combines a large storage capacity with high performance characteristics.

The above object is carried out in the present invention by provision of a random access memory in which a plurality of strips can be processed simultaneously in a single read/write station and in which all the strips of the memory are stored immediately adjacent to the read/write station. In the present device, a fixed read/write station is provided with a housing having a cylindrical interior chamber which is connected to the exterior of the housing by a plurality of circumferentially spaced, tangentially extending entry chutes. An array of magnetizable strips is disposed in trays or bins which are positioned adjacent the opening of each entry chute. Means is provided for selecting a strip from its associated tray and then extending it through the chute into the interior of the chamber. A generally-cylindrical head drum containing a plurality of spaced rows of read/write transducers is mounted for rotation within the chamber. The head drum is constantly rotated at a uniform speed, so that each row of transducers traverses each of the selected strips during every rotation of the drum.

The foregoing and other objects, features and advantages of the invention will be apparent from the following more particular description of a preferred embodiment of the invention, as illustrated in the accompanying drawings.

Figure 2:
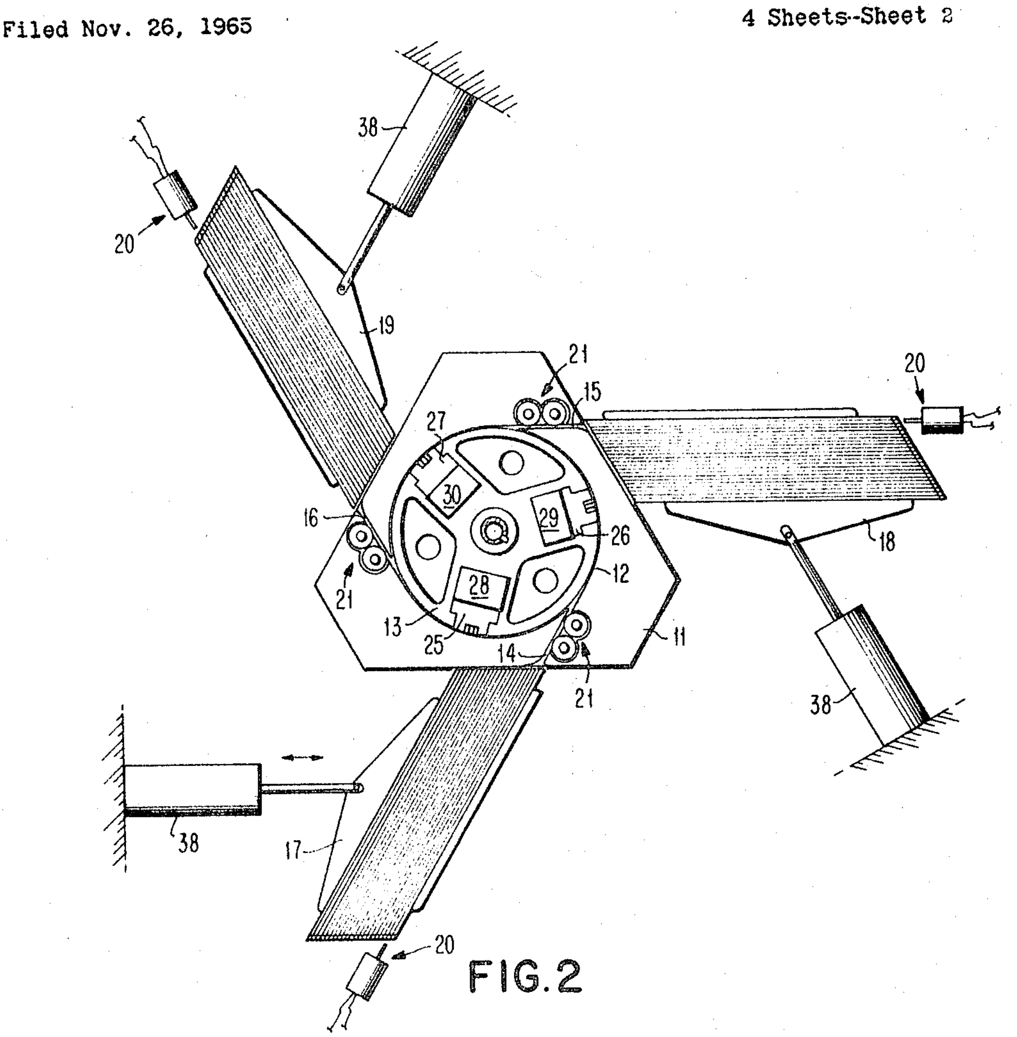
FIG. 2 is a plan view of a read/write station according to the present invention.

The basic structural features of the present invention are illustrated in the read/write station of FIG. 2. These include a generally-triangular housing 11 having an internal cylindrical chamber 12, formed therein. A cylindrical head drum 13 is mounted for rotation within the chamber 12 and a plurality of entry chutes 14–16 extend tangentially of the chamber to the exterior of the housing. The entry chutes are evenly spaced about the circumference of the chamber and effectively divide the cylindrical surface of the chamber into a plurality of recording segments. Strip storage trays 17–19 are positioned at the exterior of the housing immediately adjacent the exterior opening of each entry chute. A strip selection means 20 cooperates with each tray to thrust a selected strip into the associated entry chute. Strip drive means, shown generally at 21, is provided in the housing adjacent each of the entry chutes to propel the selected strip into the cylindrical chamber for cooperation with the rotating head drum.

Figure 1:
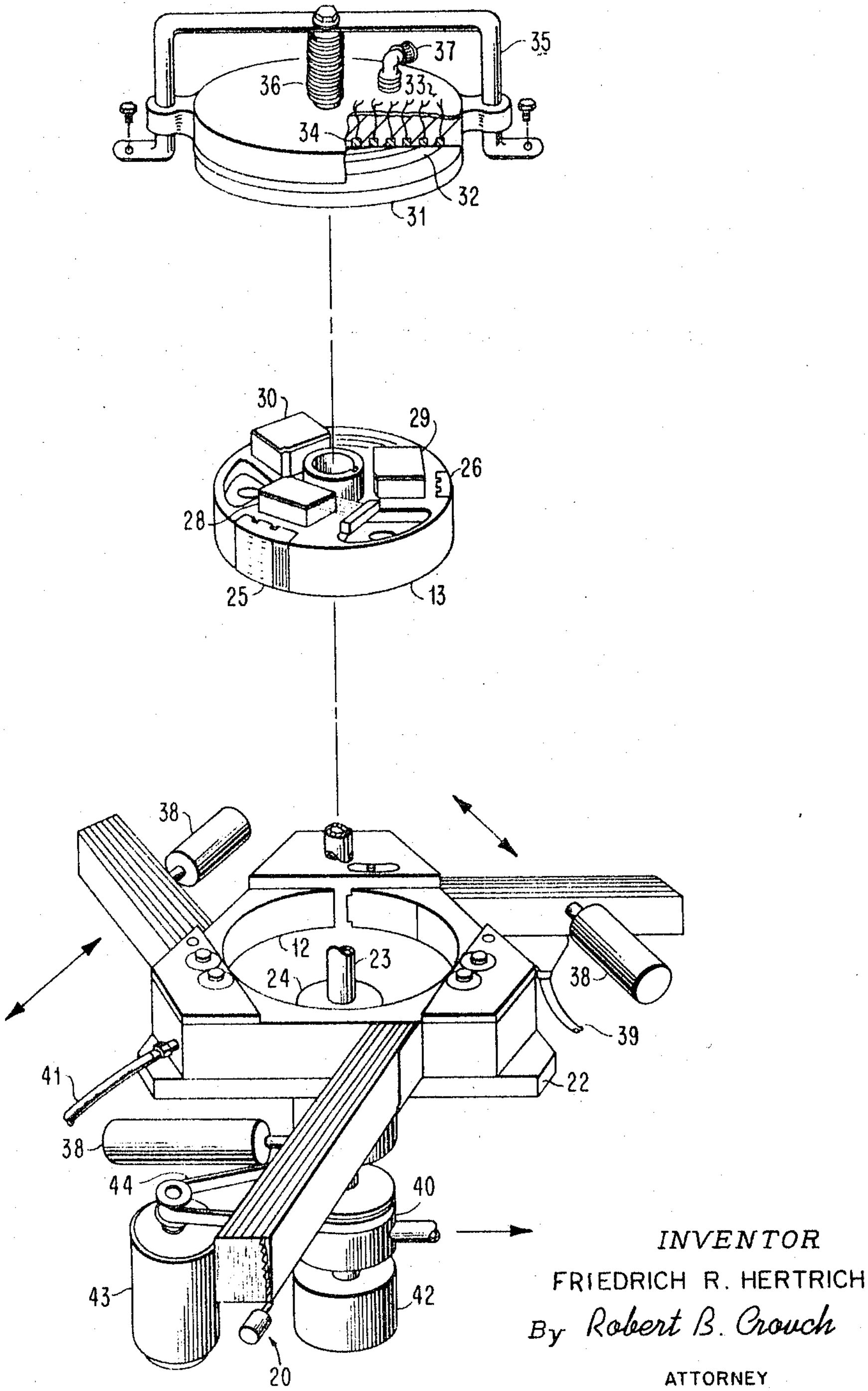
FIG. 1 is an exploded view in perspective of a random access memory according to the present invention.

As shown in FIG. 1, the housing 11 is supported on a base plate 22 which is part of the frame structure of the machine. A hollow shaft 23 extends through the base plate along the central axis of the chamber 12 and is suitably journaled in the base plate as shown at 24. The upper end of the shaft 23 is secured to the head drum 13. The head drum includes a plurality of magnetic head bars 25–27 mounted at the periphery of the drum and equally spaced about the circumference thereof. Each head bar includes a number of magnetic read/write elements or heads positioned parallel to each other and aligned along a projection of the axis of the drum. Much of the read/write circuitry (read amplifiers, write drivers, head selection matrix, etc.) is mounted on the head drum adjacent the respective head bars as shown diagrammatically at 28–30. A cover plate 31 is fitted over the upper surface of the head drum and secured thereto. The upper surface of the cover plate carries a plurality of concentric rings of conductive material 32 which are separated from each other by a suitable insulator. A fixed plate 33 is positioned above the cover plate 31 and supported from the frame structure of the machine, such as by bracket 35 secured to the base plate 22. The lower surface of the fixed plate 33 is provided with a plurality of concentric rings 34 of conductive material suitably insulated from each other, the rings 34 being aligned with the rings 32 on the cover plate 31. The fixed plate is loaded toward the cover plate by suitable means, such as a compression spring 36 acting against bracket 35. Means, such as hose connection 37, is provided for injecting air between the confronting surfaces of cover plate 31 and fixed plate 33, so as to form an air lubricated bearing therebetween.

Each of the strip storage trays 17–19 is provided with a separate high speed actuator 38 for moving the tray past its associated entry chute. The actuators may be any suitable hydraulic or electromechanical linear motors, such as employed in the access mechanisms of current disk memories, e.g., IBM 2311 Disk Storage Drive. Each tray is further provided with a hose connection 39 for supplying air under pressure to the interior of the tray. The interior of the hollow shaft 23 is connected to a source of low pressure air or partial vacuum, such as through a manifold 40 surrounding a series of radially extending openings (not shown) in the shaft. Low pressure air is also supplied through a hose connection, such as at 41, to each strip drive means 21 which includes a pair of oppositely-rotating, constantly-driven, capstans and valving for applying low-pressure air to either capstan. Any suitable vacuum capstan, such as is commonly used in magnetic tape transports may be used in the strip drive means. A generator shown at 42 is connected to the lower extremity of shaft 23, so that the movable field of the generator rotates with the shaft. A suitable drive motor 43 is drivingly connected to the shaft, such as through a belt and pulley connection shown at 44.

Figures 3, 3A, 4:
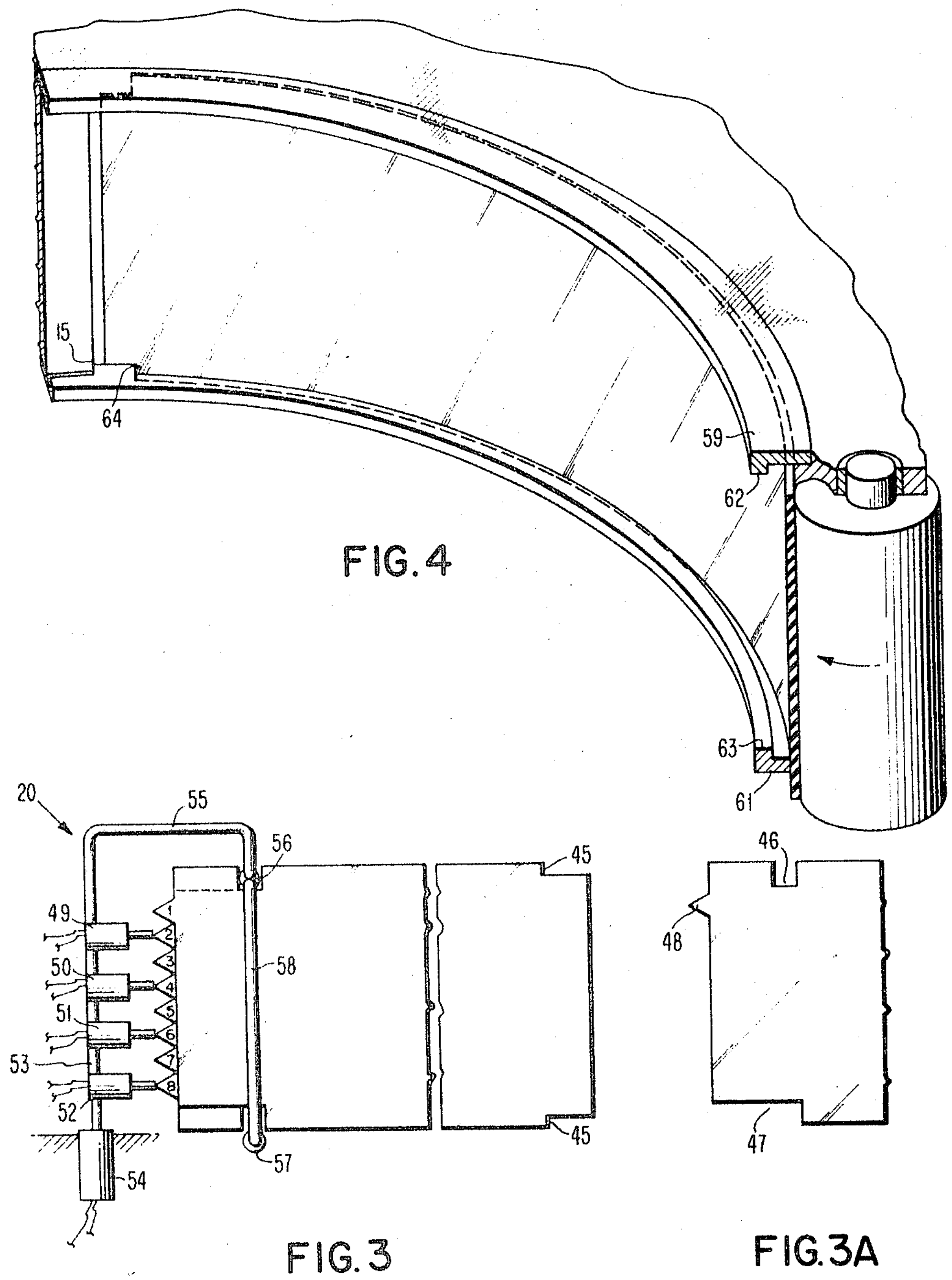
FIGS. 3 and 3A are elevation views at an enlarged scale showing the strip selection means and strip construction of FIG. 2.
FIG. 4 is an elevation view at an enlarged scale showing a strip in recording position in the cylindrical chamber of the housing.

Referring to FIGS. 3 and 3A, the magnetic recording strips employed with the present invention are made of strips of a suitable substrate material, such as Mylar,[1] having a magnetic coating on one or both surfaces. The individual strips are approximately 2¼ inches wide by 11½ inches long with an effective recording area approximately 7½ inches in length. Each strip is provided with a leading edge which is adapted to be extended through an entry chute into a recording segment, and a trailing edge which is retained within the storage tray. The leading edge of each strip is relieved at the corners to form a pair of shoulders 45. A narrow groove 46 and a wide groove 47 are formed in the opposite longitudinal edges of each strip adjacent the trailing edge. The leading edges of the grooves are aligned with each other transversely of the strip, with narrow groove 46 spaced from the trailing edge of the strip while wide groove 47 is open to the trailing edge. A tab 48 of any suitable cross-section protrudes from the trailing edge of each strip. The strips are arranged in parallel fashion in a storage tray with their longitudinal edges aligned and are grouped in subcells of eight strips per subcell. The strips within each subcell are identical, except that the tabs of adjacent strips are offset in a sequential manner as shown in FIG. 3. The tab widths are dimensioned such that there is room for approximately eight tabs across the width of the strip. The tabs of the various strips within a subcell are displaced in a sequence across the width of the strips with the tab on the first strip adjacent the upper edge of the strip and the tab on the eighth strip adjacent the lower edge of the strip. The strip selection means 20 is illustrated in FIG. 3 as including four horizontal solenoid actuators 49, 50, 51 and 52 arranged in vertical alignment and spaced such that the armatures of adjacent solenoids are in line with alternate tabs of the subcell. The solenoids are mounted on a vertical support 53 which is in turn connected to a vertical solenoid actuator 54. An arm 55 extends from the upper end of support 53 longitudinally of the strips and is slidably secured to an odd-even selection mechanism which includes a pair of transversely-extending, vertically-aligned rods 56 and 57, maintained in spaced relation by a bar 58. The strips are arranged in alternately reversed fashion within the subcell, that is, the odd numbered strips, 1, 3, 5 and 7, are positioned with the narrow groove 46 along the upper edge and wide groove 47 at the lower edge. The even numbered strips, 2, 4, 6 and 8, are arranged with the wide groove 47 at the upper edge and narrow groove 46 at the lower edge.

[1] Trademark of E. I. du Pont.

Referring to FIG. 4, the internal cylindrical chamber of the housing is provided with a pair of spaced circular guide rings 59 and 61. The guide rings are supported on the housing 11 at the upper and lower edges of the cylindrical chamber. The guide rings are provided with oppositely-directed inturned edges 62 and 63 along the internal circumference thereof. The inturned edges overlie the upper and lower edges of the cylindrical surface of the chamber to define oppositely-directed narrow grooves in the rings. These grooves are interrupted at intervals by stops 64, a pair of stops being located immediately adjacent each entry chute as shown in FIG. 4. The oppositely-directed grooves are continuous over the length of each recording segment and extend from the internal opening of each entry chute to the stops adjacent the next entry chute in the direction of rotation of the head drum.

Figure 5:
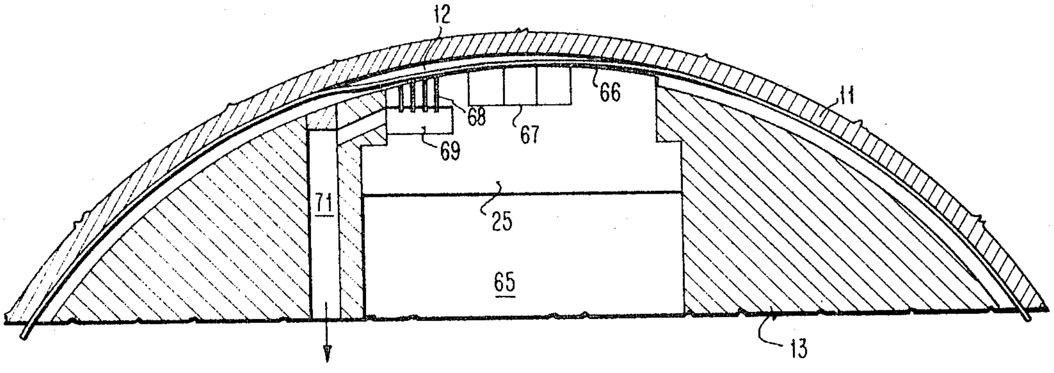
FIG. 5 is a plan view at an enlarged scale showing the strip and head drum in recording relation.
Figure 6:
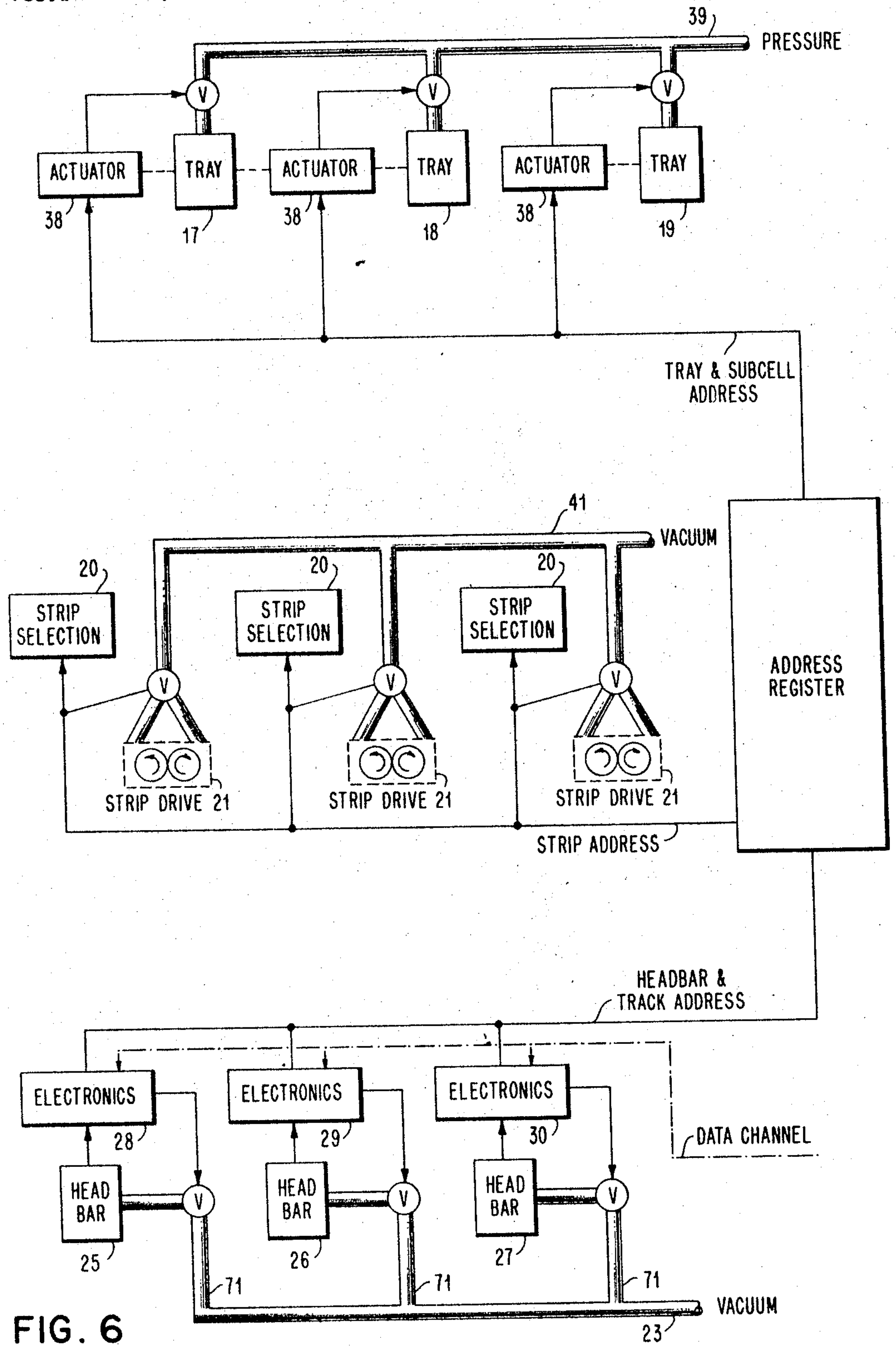
FIG. 6 is a schematic view of an access system for presenting a data channel to a desired track on a strip.

As illustrated in FIG. 5, the head drum 13 is provided with a slightly smaller circumference than that of the cylindrical chamber within which it rotates, so that the external surface of the head drum is spaced radially from the cylindrical surface of the chamber. Each of the head bars 25–27 is positioned within an enlarged, radially-extending opening 65 in the head drum. Each head bar is provided with an arcuate external surface 66 which has a somewhat smaller radius of curvature than that of the head drum. The head bars are mounted within openings 65 such that the arcuate surfaces 66 protrude radially from the external surface of the head drum. A series of read/write elements 67 are aligned along the approximate center line of the arcuate surface of each head bar. A number of slots 68 adjacent the leading edge of each head bar communicate between the arcuate surface 66 and a manifold 69 formed in the body of the head bar. A passageway 71 formed in the head drum extends between manifold 69 and the interior of hollow shaft 23. Suitable means, such as a solenoid-actuated on-off valve (shown schematically in FIG. 6) is provided in passageway 71 for controlling the connection between each manifold 69 and the shaft 23.

In a random access data storage device, such as a drum, disk, or strip memory, data is usually assembled in the form of a record which is then recorded in a track within the memory. To permit access to a record for the purpose of reading or updating the data, each record is assigned an address which is a function of its location within the memory. In the present device, a record address, as entered in the address register of FIG. 6, would identify a particular strip storage tray, one subcell within the tray, a single strip within the subcell and an individual track on the strip. Thus, in accessing to a record address, the linear actuator 38 associated with a specified tray would be energized to move the tray relative to the recording station and align the selected subcell between the strip selection means 20 and its associated entry chute 14, 15 or 16. After the subcell is in position, the strip selection means is actuated to select one strip from among the eight strips in the subcell. Assuming that the desired strip is No. 4 of FIG. 3, solenoid 54 is left in its retracted position as shown. In this position, the strip selector solenoids 49–52 are aligned with the tabs on the even numbered strips and rod 56 is positioned in the narrow grooves 46 of the odd numbered strips. At the same time, rod 57 is out of engagement with the corresponding narrow grooves of the even numbered strips. Strip selector solenoid 50 is energized to drive its armature into engagement with the tab of strip No. 4 and impart a sharp force thereagainst, thus propelling strip No. 4 from the subcell. Since adjacent strips in the subcell are in close contact with each other throughout their length, the effects of static electricity, surface tension, drag, etc., tend to cause any movement of one strip to be transmitted to the adjacent strips on either side. In the present device, strips 3 and 5 are retained in position within the subcell by rod 56 in engagement with grooves 46. The even numbered strips are free to move since rod 57 is out of engagement with the narrow grooves of the even numbered strips and the wide grooves 47 of such strips will slide under rod 56. However, motion is not transmitted form one even numbered strip to another, since the odd numbered strips in between are restrained. If selection of an odd numbered strip is desired, solenoid 54 will be energized to extend the strip selector solenoids into alignment with the tabs on the odd numbered strips. At the same time, rod 56 is lifted free of the narrow grooves 46 in the odd numbered strips and rod 57 is brought into engagement with the corresponding narrow grooves of the even numbered strips. The even numbered strips are thus restrained while the odd numbered strips are free to move in response to the force delivered by whichever strip selector solenoid is energized.

The force imparted to the selected strip by the strip selector solenoid causes the leading edge of the selected strip to enter the entry chute in the housing where it is engaged by a capstan of the strip drive means 21. In this case, vacuum is switched to the forward drive capstan to draw the leading end of the selected strip into contact with that capstan. The leading end of the strip is then driven by the capstan into the oppositely-directed grooves in the guide rings 59 and 61 and follows these grooves until the shoulders 45 contact stops 64. In this position, the selected strip extends over approximately one-third of the circumference of the chamber while the tab end of the strip remains in the subcell. With the strip in recording position, the rotation of the head drum causes the individual read/write elements of the various head bars to scan the full length of the recording area of the strip. The head drum, rotating at a constant speed of approximately 1800 r.p.m., generates an air bearing between its own exterior surface and the strip. The head bars prortuding from the external surface of the head drum create a wedging effect in the air of the air bearing ahead of the ahead bars. This wedging effect reacts against the strip with both a circular and a radial component. The strip is thus firmly seated against the cylindrical surface of the chamber and against the stops, thus assuring accurate registration of the strip from one access to another. In order to record on or read from a strip with the present device, it is necessary that a minimum constant spacing be maintained between the read/write elements and the recording surface of the strip. This is achieved by low pressure air or partial vacuum supplied to one or more of the head bars through hollow shaft 23, passageways 71, manifolds 69 and slots 68. The vacuum applied through slots 68 overcomes the positive pressure between the drum and the strip and draws the strip from the cylindrical surface of the chamber into proximity with the read/write elements. By means of the vacuum, the strip is caused to comply with the arcuate surface 66 of the head bar. The amount of vacuum applied through slots 68 is controlled, so that the strip is not drawn into contact with the head bar and the air bearing destroyed, but rather is drawn close to the head bar and the thickness of the air bearing reduced. The strip complies with the cylindrical surface of the chamber both ahead of and behind the head bar.

Access to a track on the strip is gained by selection of the appropriate head bar and then the read/write element which scans the desired track. The read/write electronics associated with the appropriate head bar is connected to the data channel and vacuum is switched to that head bar. The read/write element which scans the desired track is switched on through a conventional head selection matrix included in the read/write electronics. Power is supplied to the selected read/write element from the generator 42. Since the rotating element of the generator and the head drum are both secured to the shaft 23 and rotate together, the electrical connection between the generator and the head selection matrices carried in the head drum can be made through the hollow shaft. Signal lines for reading and writing of data are brought into the read/write electronics 28–30 through the concentric rings 32 and 34 in the plates 31 and 33. The signal lines are connected to rings 34 while the electronic assemblies in the head drum are connected to rings 32. There are ten rings on each of the plates 31 and 33 to accommodate ten channels or lines between the head drum and a control unit. The fixed plate 33 is loaded toward the cover plate 31 by means of the compression spring 36, but is separated therefrom by an air bearing generated by air supplied through connection 37. The spacing between the two plates is determined by the force exerted by the compression spring in combination with the quantity of air injected between the disks. By selection of a relatively large loading force, the thickness of the air bearing will remain constant as long as air is supplied at a constant pressure. The result is that the plates and the concentric rings are spaced a fixed distance (approximately .0008") apart. The concentric rings then function as a capacitor and may be used not only for coupling purposes but to obtain a capacitive effect in the signal lines where desired.

When the read/write operation on the selected strip has been completed, the strip is returned to its original position in the subcell by switching vacuum from the forward drive capstan of the strip drive means 21 to the reverse drive capstan. At the same time, air is supplied to the storage tray through hose connection 39 to lubricate both surfaces of the strip and assist in its return to its original position. The air lubrication reduces the drag on the strip and permits sufficient acceleration to be imparted to the strip by the reverse capstan to cause it to seat in its original position shown in FIG. 3.

While the strip selection process has been illustrated in connection with a single strip, it is apparent that a strip may be selected from each of the storage trays simultaneously. Three strips would thus be in recording position at the same time and each recording segment of the cylindrical chamber would be occupied. The storage trays are actuated individually, so that strips may be selected simultaneously or in an overlapping sequence as desired. The average access time for the present device thus becomes considerably less than the time required to select a single strip. An additional feature of the present device is that it has "on line" capability if desired. Since the strips conform to the circumference of the chamber, the low pressure air supplied to the head bars may be switched off allowing the head drum to rotate continuously past the strips without incurring any strip wear. One or more of the strips may thus be held "on line" and access had to them as desired merely by switching the low pressure air to a selected head bar. Since the head bars do not contact the recording surface of the strip during read/write operation, and since the drive capstans contact only the reverse side of the strip, wear on the recording surface is effectively limited to that caused by moving the strip from and into the subcell. Since both surfaces of the strip are lubricated during the selection and return movements, little wear occurs and the strips will have an extremely long effective life.

In the device illustrated, each strip is provided with 132 parallel tracks and each of the three head bars contains forty-four read/write elements spaced at regular intervals across the width of the strip. With this arrangement, the read/write elements of head bar 26 would service tracks 1, 4, 7, . . . 130, while those of head bars 27 would service tracks 2, 5, 8, . . . 131 and those of head bar 28 would service tracks 3, 6, 9, . . . 132. The head bars themselves, as illustrated, are positioned 120 degrees apart. With this configuration, every track on three strips is scanned during each rotation of the head drum. However, the number of read/write elements employed and the distribution of the elements in the head bars, as well as the location of the head bars in the head drum, may be varied to accommodate particular applications of the device.

With the present device the tape strips are stored in close proximity to the head drum and need be moved but a minimum distance to be brought into recording position. The number of strips in the array can be varied for different applications by varying the number of subcells in a tray or by increasing the number of trays. In this respect it is contemplated that a plurality of trays could be stacked adjacent each entry chute. This would require movement of the tray stack parallel to the axis of shaft 23 to bring the desired tray into vertical alignment with the entry chute before the tray is moved horizontally to select the subcell. Three entry chutes have been shown, but it is understood that the shape of the housing may be modified to accommodate any desired number of entry chutes and trays, depending upon the number of strips it is desired to present to the head drum at any one time.

While the invention has been particularly shown and described with reference to a preferred embodiment thereof, it will be understood by those skilled in the art that the foregoing and other changes in the form and details may be made therein without departing from the spirit and scope of the invention.

I claim:

1. A random access memory comprising:
- a fixed read/write station which includes a constantly rotating magnetic head drum mounted therein;
- an array of magnetizable strips positioned adjacent the read/write station; and
- means for selecting a plurality of separate strips and moving them independently into different circumferential positions immediately adjacent the head drum.

2. A random access memory as recited in claim 1 which includes:
- a plurality of magnetic read/write elements mounted in the head drum; and
- means connected to the head drum for drawing one or more of the selected strips into proximity with the magnetic elements.

3. A random access memory as recited in claim 1 in which:
- the read/write station includes a housing having an interior cylindrical chamber and at least one entry chute extending between the chamber and the exterior of the housing, the magnetic head drum being mounted for rotation within the chamber; and
- the last named means includes means for moving the strip through an entry chute into position adjacent the head drum.

4. A random access memory as recited in claim 3 which includes:
- a plurality of entry chutes evenly spaced about the chamber, the entry chutes dividing the circumference of the chamber into a plurality of recording segments; and
- the means for selecting includes means for selecting a plurality of separate strips and moving them through the entry chutes into different circumferential positions in the recording segments.

5. A random access memory as recited in claim 3 including:
- a plurality of entry chutes evenly spaced about the chamber, the entry chutes dividing the circumference of the chamber into a plurality of recording segments;
- the strips disposed in trays which are positioned adjacent the entry chutes; and
- separate means associated with each tray for selecting a strip and propelling it into an entry chute.

6. A random access memory as recited in claim 5 including:
- means mounted in the housing adjacent each entry chute for driving a strip into and then out of a recording segment; and
- means for moving the trays to position a desired strip in alignment with its associated entry chute.

7. A random access memory as recited in claim 6 which includes:
- a plurality of magnetic read/write elements mounted in the head drum; and
- means connected to the head drum for drawing the strip into recording relationship with the magnetic elements.

References Cited

UNITED STATES PATENTS

| | | | |
|---|---|---|---|
| 3,302,829 | 2/1967 | Wilmer | 340—174.1 |
| 3,294,902 | 12/1966 | Maxey | 179—100.2 |
| 3,183,494 | 5/1965 | Welsh | 340—174.1 |
| 3,176,279 | 3/1965 | Lin et al. | 340—174.1 |
| 2,722,676 | 11/1955 | Begun | 340—174.1 |
| 3,349,385 | 10/1967 | Studley | 340—174.1 |
| 3,406,382 | 10/1968 | Wilmer | 340—174.1 |

OTHER REFERENCES

Carrell, Ross M.: "High Speed Random Access Transport," RCA Technical Notes, No. 453, September 1961.

BERNARD KONICK, Primary Examiner

VINCENT P. CANNEY, Assistant Examiner